UNITED STATES PATENT OFFICE.

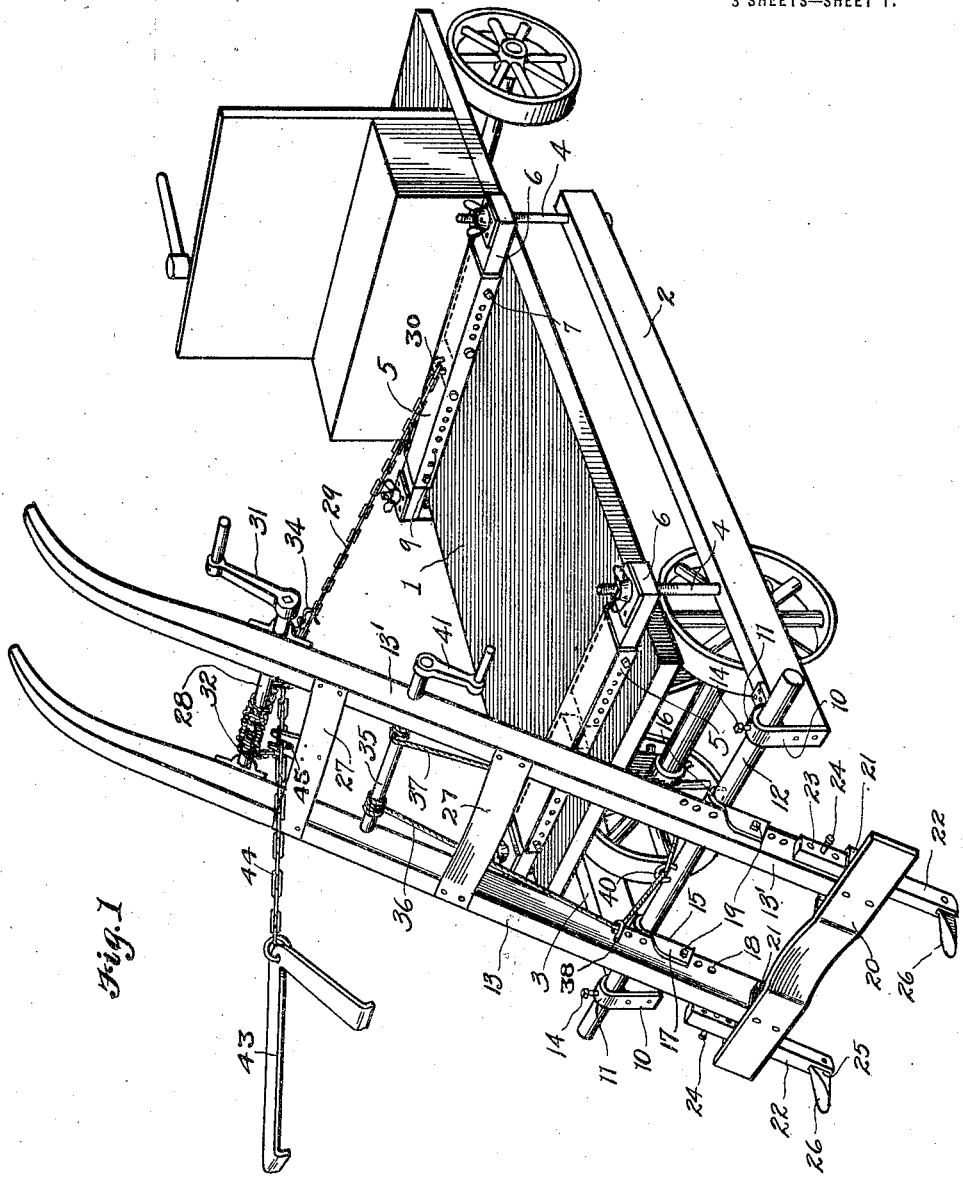

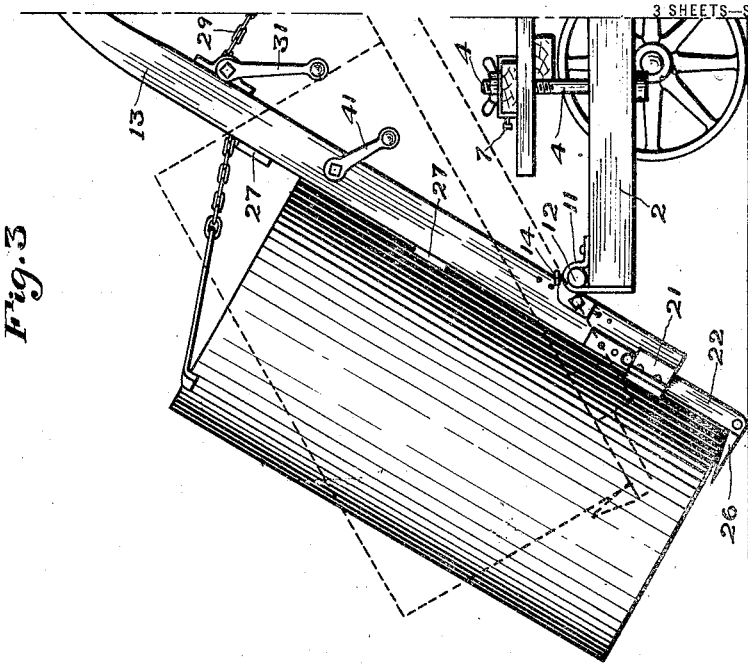
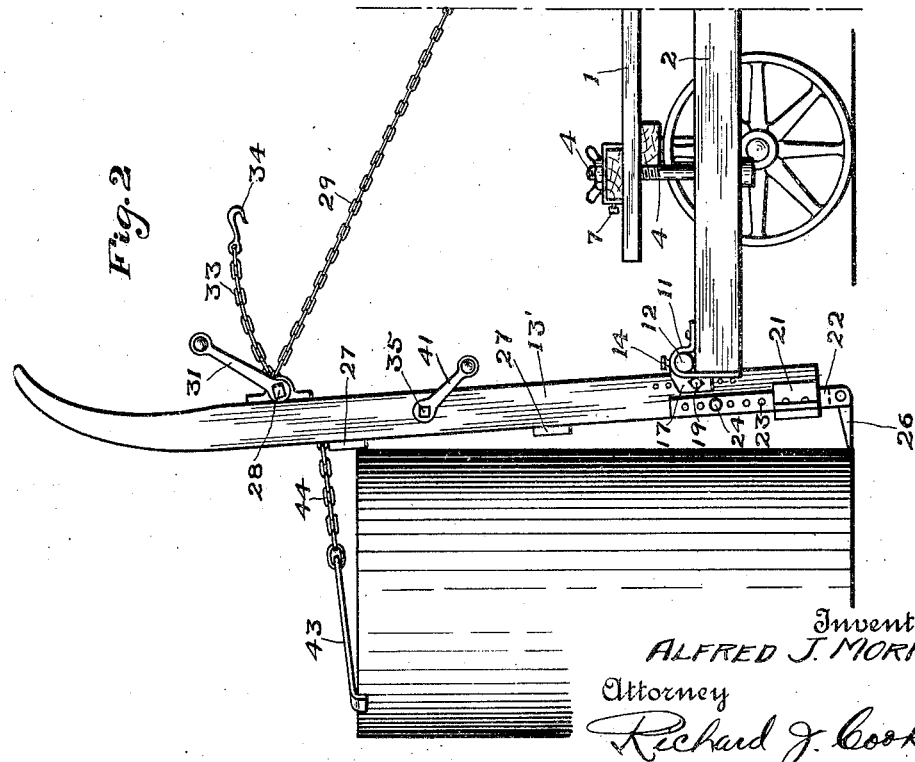

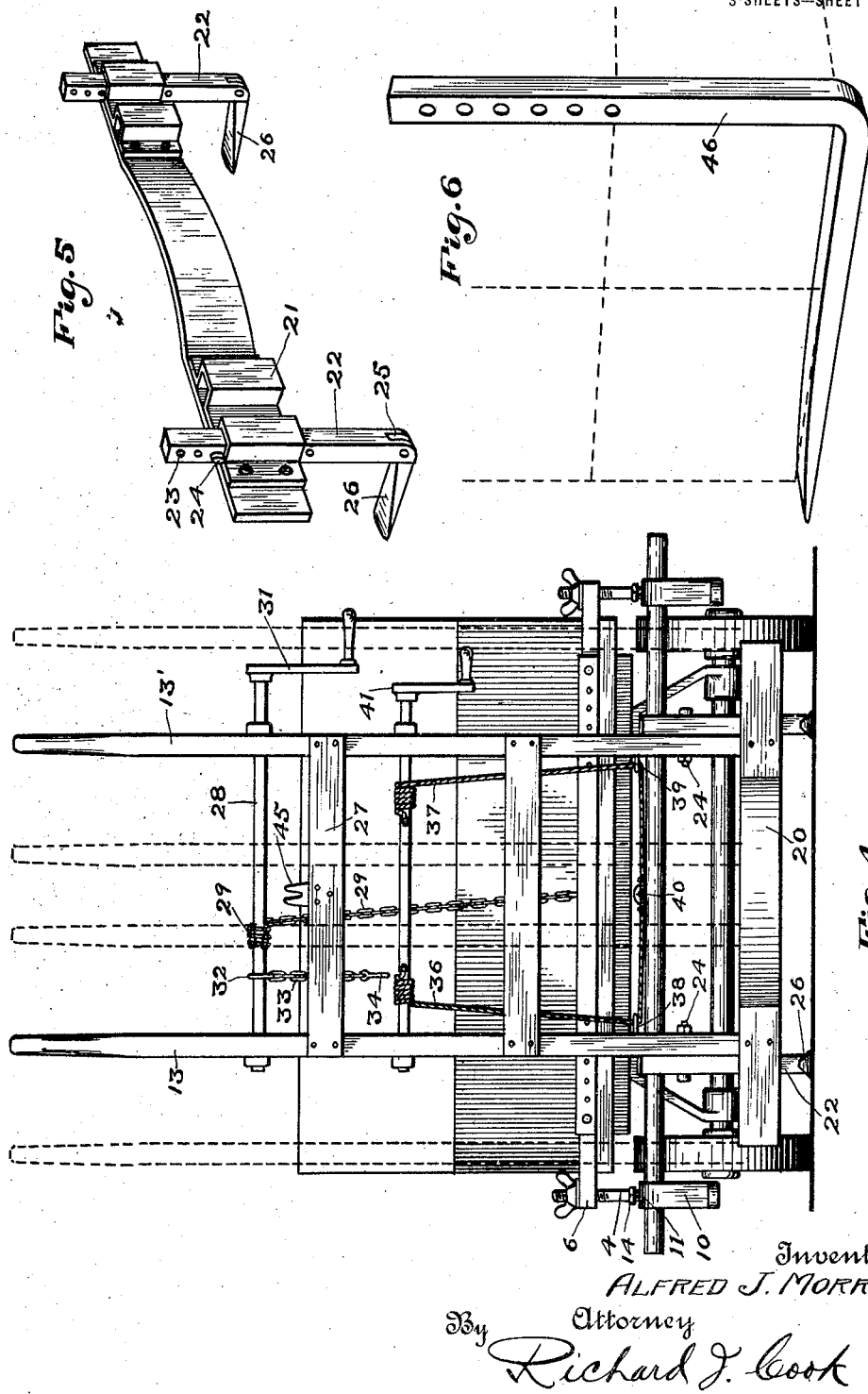

ALFRED JOHN MORROW, OF SEATTLE, WASHINGTON, ASSIGNOR TO CLARE E. FARNSWORTH, OF SEATTLE, WASHINGTON.

TRUCKING MECHANISM.

1,425,999.           Specification of Letters Patent.    Patented Aug. 15, 1922.

Application filed January 4, 1921. Serial No. 434,902.

*To all whom it may concern:*

Be it known that I, ALFRED J. MORROW, a citizen of the United States, and resident of the city of Seattle, county of King, State of Washington, have invented certain new and useful Improvements in Trucking Mechanism, of which the following is a specification.

My invention relates to improvements in trucking mechanism, more particularly it relates to freight handling or trucking mechanism of that character especially adapted for use in conjunction with that type of four wheeled trucking vehicles, driven by motor or otherwise, that are commonly used about docks, ware-houses, railway stations and other places where heavy freight is handled.

The principal object of the present invention is to provide trucking mechanism that may be conveniently and easily mounted functionally upon any of the common types of motor driven trucks, or on trailer vehicles, and which is of such construction as to adapt it especially for the handling of excessively heavy articles, such for instance as large rolls of paper, boxed pianos, crated machinery, etc.

More specifically stated, it is the object of the invention to provide a one-man trucking device, embodying in its construction, a supporting frame that is adjustable to adapt it to be mounted on trucks of various widths and heights and whereon trucking handles, or bars, are pivotally mounted so that they may be positioned to receive articles thereon and are equipped with means whereby they may be actuated to raise and support the articles for transportation from the said frame and truck.

Other objects of the invention reside in the detail construction of the supporting frame, the trucking mechanism, the automatically extendable supporting legs and the means whereby the trucking mechanism may be shifted laterally of the frame to position it properly with respect to the article to be loaded.

In accomplishing these and other objects of the invention, I have provided the improved details of construction, the preferred forms of which are illustrated in the accompanying drawings, wherein—

Figure 1 is a perspective view of a motor driven trucking vehicle, equipped with trucking mechanism that is constructed and mounted according to the present invention.

Figure 2 is a side elevation of a part of the vehicle and trucking mechanism, showing the latter positioned for the loading of a paper roll thereon.

Figure 3 is a similar view, showing the paper roll being loaded upon the truck, particularly illustrating the manner of tilting the trucking handles and the roll which is attached thereto to permit the truck feet to be extended automatically beneath the lower end of the roll.

Figure 4 is a rear end elevation of the vehicle and trucking mechanism, showing in dotted lines the shifting of the truck handles to different positions transversely of the supporting frame.

Figure 5 is an enlarged, detail view of the truck nose and the automatically extendable legs thereon.

Figure 6 is a perspective view of an alternative type of foot for use in the handling of small boxes of canned goods or the like.

Referring more in detail to the several views of the drawings wherein like reference numerals designate the same or like parts—

1 designates the platform of a trucking vehicle of the type for which the present mechanism is intended, and which may be of the usual four wheeled character, driven by an electric motor or otherwise, and of the usual dimensions; this being also equipped with mechanism whereby it could be steered as desired when in use.

Mounted upon the platform 1 is a trucking frame which in its preferred construction comprises opposite, longitudinally extending side rails 2 and 3, which are adjustably supported horizontally at opposite sides of the vehicle by means of bolts 4, or other suitable hangers, fixed dependingly to the opposite ends of transverse supporting beams which overlie the truck platform adjacent its forward and rearward ends.

For the purpose of adjusting the frame to adapt the device to trucks of various widths, the transverse beams are each made up of a central, downwardly facing channel member 5 wherein beam sections 6 are adjustably mounted to be extended accordingly as is necessary for the proper clearance of the side beams carried thereby; the beam sections being fixed at desired positions of adjustment by the use of bolts 7 that are extended through transverse bores in these sections and through paired, registering apertures 9 in the opposite side flanges of the channel members.

The beams 2 and 3 extend rearwardly of the truck platform an equal distance and at their ends are equipped with bands 10 which form loops 11 thereon wherein a round, transverse bar 12 is slidably contained and upon which, between the beams, a pair of trucking handles, or bars 13—13' are pivotally supported. The bar 12 is slidably contained within the loops and is of sufficient length to permit its use when the frame is widened to its limit, and after an adjustment is made, it is held against longitudinal movement by means of set screws 14 threaded through the loops 11 to engage it.

The bars or handles 13—13' are pivotally supported from the cross bar 12 by means of plates 15 which are secured thereto and which at their upper ends have downturned hooks 16 wherein the bar is adapted to be received in such manner as to pivotally support the handles to swing vertically. The plates 15 also have upturned opposite side flanges 17 between which the handles are received and these flanges have apertures therein which may be brought into registration with selected apertures 18 along the handles, to receive bolts 19 so that the suspending members may be fixed at adjusted positions accordingly as is required for trucks of different heights.

The trucking bars are also of equal length and at their lower ends are connected by a nose plate, or bar 20, which extends at its ends considerably beyond the handles, and on its inner side has a plurality of spaced apart guide loops 21 fixed thereto wherein extension legs 22 in paired relation as shown, are slidably mounted to move longitudinally in the direction of the bars. Along their upper ends the legs are each provided with a series of apertures 23 for receiving pins 24 which will engage the guide loops to limit the outward movement of the legs therein, and at their lower ends each leg is provided with a slot 25 wherein a foot 26 is pivotally mounted to move a limited distance above and below perpendicular position with respect to the leg.

Along their upper portions, the handles are connected by one or more cross plates 27 and adjacent their upper ends have a cross shaft 28 rotatably supported thereby about which one end of a chain 29 is wound; the opposite end of the chain being fixed in an eyelet 30 in the front cross beam of the frame. At one end this shaft has a crank 31 fixed thereon whereby it may be actuated to wind or unwind the chain to tilt the trucking handles accordingly. Also, mounted on this shaft is a ring 32 whereto a short chain 33 is fixed and which, at its end, has a hook 34 adapted to be hooked into the chain 29 to hold the handles at any adjusted position.

For the purpose of shifting the trucking handles laterally of the frame, I have provided a shaft 35 that is mounted somewhat below the shaft 28 and which has two cables 36 and 37 wound thereon in opposite directions. These extend downwardly and respectively through eyelets 38 and 39 in the inner sides of the opposite handles 13 and 13' adjacent to the cross shaft 12 and at their ends are secured to an eyelet 40 fixed in the bar 12 at its center. At one end the shaft 35 has a crank 41 thereon whereby it may be actuated and it is apparent that rotation of the shaft in opposite directions will cause shifting of the trucking mechanism in opposite directions along the bar 12 accordingly as the shaft 35 is rotated.

When articles are to be loaded onto the truck, the device is backed up to the article with the handles in substantially perpendicular position, as is shown in Figure 2, and if necessary, the handles are shifted laterally along the bar 12 by actuation of the shaft 35 to center them with respect to the article to be loaded. The upper end of the article is then tied to the handles so that when they are tilted back, the article will follow therewith and will ultimately rest upon the cross plates 27 and nose 20. A desirable means for this tilting consists of a V-shaped hook device 43 that may be secured to the article and which has a chain 44 secured thereto and which latter may be hooked within a notched plate 45 secured to the upper cross plate.

It will be noted by reference to Figure 2 that when the handles are in vertical position, the legs 22 are raised in the guide loops by contact of their lower ends with the floor and that the feet 26 lie flush on the floor.

Assuming then that a paper roll is being loaded: First its upper end is secured by the hook 43 and chain 44 to the trucking handles. The shaft 28 is then rotated to wind the chain 29 thereon to tilt the handles and roll, as is illustrated in Figure 3, and as the cross plate 20 moves toward the roll and upwardly from the floor, the legs 22 slip downwardly in their guide loops and the feet 26 are projected beneath the raised edges of the roll at its opposite sides. As the tilting continues, the legs 22 reach their limit of travel downwardly, and finally the roll is raised from the floor in an inclined position of support upon the trucking handles, and in position for transportation.

In Figure 6, I have shown a loading shoe 46 to be used in place of the legs 22 when small boxes of canned goods or the like are being handled. These are constructed in such manner that two rows of boxes of the type in which canned goods are packed, may be loaded.

With this latter shoe, and in the construction previously described, when boxed goods are handled, it is necessary that they be slightly raised from the floor to permit the feet to extend under the same when the truck handles are tilted forwardly, but this is not necessary for loading rolls of paper, barrels or the like.

It is apparent that a device so constructed will greatly facilitate the handling of heavy articles. It has been found that with it, one man can load what ordinarily requires three men to handle and can do it in less time.

It is also noted that the features of adjustment adapt the device to trucks or trailers of different sizes, and that by providing for the lateral shifting of the trucking mechanism on the frame, accuracy in backing the device to the article to be loaded is not required.

It is apparent also that various details of construction could be made without departing from the spirit of the invention, and I do not wish to be limited only to the construction shown.

Having thus described my invention, what I claim as new therein and desire to secure by Letters-Patent, is:

1. A trucking device comprising in combination with a wheeled vehicle, a supporting frame applicable to said vehicle and comprising laterally adjustable side beams, a cross bar supported by said beams at one end of the vehicle, a pair of trucking handles pivotally mounted upon said cross bar to swing vertically between substantially vertical loading position and inclined position for transporting articles thereon, and means on said handles for sustaining articles thereon for transportation.

2. A trucking device comprising in combination, with a wheeled vehicle, a supporting frame applicable to said vehicle and comprising laterally adjustable side beams, a cross bar supported by said beams at one end of the vehicle, a trucking frame pivotally mounted upon said cross bar and movable therealong, and adapted to swing vertically between substantially upright loading position and inclined position for transporting articles thereon, and means operable to swing the trucking frame between loading and transporting position and for retaining it at set positions.

3. A trucking device comprising in combination with a wheeled vehicle, a supporting frame comprising cross beams adapted to overlie said vehicle body and having adjustably extendable sections at their opposite ends, side beams adjustably suspended from said extendable sections along opposite sides of the vehicle to project rearwardly thereof, a cross bar supported by said side beams at the rear of said vehicle, a pair of trucking handles pivotally mounted on said bar, means for shifting the trucking handles along said bar transversely of the vehicle, means on said handles for engaging, and for lifting articles to be loaded, by the movement of said handles from loading to inclined transporting position, and a winding mechanism for actuating the handles between said positions.

4. A trucking device comprising in combination with a wheeled vehicle, a supporting frame applicable to said vehicle and comprising a horizontal cross bar at the rear thereof, a pair of trucking handles suspended from said bar to move pivotally thereon from substantially vertical to inclined transporting position, means at the lower ends of said handle for engaging and lifting articles to transporting position by the movement of the handles from loading to transporting position and a winding shaft extended between the handles at their upper ends, eyelets fixed in the handles adjacent their pivot points, a pair of cables wound in opposite directions upon said shaft and extended respectively through the eyelets of opposite handles and secured to the cross bar between the handles, whereby rotation of the shaft in opposite directions will shift the handles bodily in opposite directions along the bar transversely of the frame.

5. A trucking device of the character described comprising in combination with a wheeled vehicle, a frame structure applicable to said vehicle comprising adjustably extendable transverse supporting beams, horizontal side beams adjustably suspended from the opposite ends of said cross beams and extending rearwardly of the vehicle, a cross rod supported by the rearward ends of said beams, a pair of trucking handles suspended to move pivotally on said bar in a vertical plane between substantially vertical loading position and inclined, transporting position upon said vehicle, said handles being equipped at their lower ends with extendable means for engaging and lifting articles by the movement of the handles from loading to transporting position, a winding shaft secured across the handles toward their upper ends, a pair of cables wound in opposite directions on said shafts and extended at their ends through eyelets in the opposite handles adjacent their pivot points, and secured to said cross bar between the handles whereby winding of the shaft in opposite directions will shift the handles laterally in opposite directions along the said bar and another winding shaft adjacent the first shaft having one end of a cable wound thereon and secured at its opposite end to said frame whereby winding of this shaft will actuate the handles toward inclined position.

6. In a trucking device of the class described, a pair of trucking handles supported from between their ends to swing about a horizontal axis, a pair of legs, having pivotally mounted lifting feet at their lower ends with a limited pivotal movement, fixed extendably to the lower ends of said handles and adapted to rest upon a floor surface when said handles are moved substantially to vertical position and to slide from the handles to continue in contact with the floor when said handles are moved to inclined position, and means for limiting the extension of said legs.

7. In a trucking device of the class described, a pair of trucking handles supported from adjacent their lower ends to swing about a horizontal supporting axis, a transverse nose plate fixed to the lower ends of said handles having paired guide loops secured thereto, legs having lifting feet at their lower ends, slidably contained in said guide loops and adapted to engage a floor surface and to be actuated inwardly within their guides when said handles are moved to vertical position and to slide outwardly therefrom to continue in contact with the floor when said handles are moved to inclined position and an adjustable means for limiting the outward extension of said legs.

8. A trucking device of the class described comprising in combination with a supporting vehicle, a frame structure adapted to said vehicle and comprising a horizontal bar at the rear thereof, a pair of trucking handles pivotally supported from between their ends to swing about said horizontal bar, a nose plate fixed transversely to the lower ends of said handles, a plurality of guide loops fixed to the inner side of said plate, extension legs slidable longitudinally in said loops having pivotally mounted lifting feet at their lower ends and having apertures at spaced intervals along their upper ends; the lower ends of said legs being adapted to engage a floor surface when said handles are moved to vertical position and to slide outwardly therefrom to continue in contact with the floor when said handles are moved to inclined position, pins applied removably to said leg apertures to limit their outward travel, a winding shaft mounted across the upper ends of said handles, a cable having one end wound on said shaft and attached at its opposite end to said frame whereby winding of the shaft will actuate the handles between vertical and inclined position.

Signed at Seattle, Washington, this 29th day of December, 1920.

ALFRED JOHN MORROW.